United States Patent
Papiashvili

(10) Patent No.: US 9,288,404 B2
(45) Date of Patent: Mar. 15, 2016

(54) METHOD AND SYSTEM FOR DETECTING FLICKER

(71) Applicant: SAMSUNG ELECTRONICS CO., LTD., Suwon-si, Gyeonggi-do (KR)

(72) Inventor: Ilya Papiashvili, Herzliya (IS)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 10 days.

(21) Appl. No.: 14/196,401

(22) Filed: Mar. 4, 2014

(65) Prior Publication Data

US 2014/0253754 A1 Sep. 11, 2014

(30) Foreign Application Priority Data

Mar. 6, 2013 (KR) .................. 10-2013-0023928

(51) Int. Cl.
*H04N 9/73* (2006.01)
*H04N 5/235* (2006.01)

(52) U.S. Cl.
CPC .................... *H04N 5/2357* (2013.01)

(58) Field of Classification Search
CPC ... H04N 5/2357; H04N 5/235; H04N 5/2351; H04N 5/243; H04N 9/735
USPC ................. 348/226.1, 227.1, 228.1
See application file for complete search history.

(56) References Cited

U.S. PATENT DOCUMENTS

| | | |
|---|---|---|
| 7,248,289 B2 | 7/2007 | Katoh et al. |
| 7,277,127 B2 | 10/2007 | Voronov et al. |
| 7,280,135 B2 | 10/2007 | Kim |
| 7,633,533 B2 | 12/2009 | Cho et al. |
| 8,004,578 B2 | 8/2011 | Chao |
| 8,040,392 B2 | 10/2011 | Ono et al. |
| 8,068,148 B2 | 11/2011 | Noyes et al. |
| 2004/0080630 A1* | 4/2004 | Kim .......................... 348/226.1 |
| 2007/0013785 A1* | 1/2007 | Kinoshita et al. .......... 348/222.1 |
| 2007/0046790 A1* | 3/2007 | Nakasuji .............. H04N 5/2357 348/226.1 |
| 2011/0157415 A1* | 6/2011 | Goh et al. ................. 348/226.1 |
| 2011/0205394 A1* | 8/2011 | Fuchigami ................ 348/226.1 |
| 2011/0292307 A1* | 12/2011 | Yagi .................................. 349/8 |
| 2012/0154629 A1 | 6/2012 | Horiuchi |
| 2012/0194698 A1 | 8/2012 | Cami |
| 2012/0320232 A1* | 12/2012 | Trumbo .................... 348/226.1 |

FOREIGN PATENT DOCUMENTS

EP 2262228 A1 12/2010

* cited by examiner

*Primary Examiner* — Sinh Tran
*Assistant Examiner* — Zhenzhen Wu
(74) *Attorney, Agent, or Firm* — Lee & Morse, P.C.

(57) ABSTRACT

An image processing system includes a plurality of active pixels and a plurality of flicker pixels. The active pixels output active pixel signals at a first readout frequency, and the flicker pixels output flicker pixel signals at a second readout frequency greater than the first readout frequency. A plurality of frequency detectors accumulate the flicker pixel signals and then perform frequency domain transformation of the accumulated flicker pixel signals. A frequency analyzer detects flicker by analyzing the flicker pixel signals which have been transformed into the frequency domain.

11 Claims, 11 Drawing Sheets

METHOD AND SYSTEM FOR DETECTING FLICKER

CROSS-REFERENCE TO RELATED APPLICATION

Korean Patent Application No. 10-2013-0023928, filed on Mar. 6, 2013, and entitled, "Method and System For Detecting Flicker," is incorporated by reference herein in its entirety.

BACKGROUND

1. Field

One or more embodiments described herein relate to image processing.

2. Description of the Related Art

Image processing systems have been used in various applications. Such systems output image frames of high quality under various light conditions. When image frames are output in an indoor environment brightened by indoor light (e.g., fluorescent light or incandescent light), fluctuations in light intensity caused by the indoor light cause flicker, which may degrade the quality of the image frames.

Attempts have been made to remove flicker under these circumstances. One attempt to remove flicker involves setting an integration time of the image processing system as integer multiple of a period of a light source in an indoor circumstance.

SUMMARY

In accordance with one or more embodiments, an image processing system comprising a plurality of active pixels to output active pixel signals at a first readout frequency; a plurality of flicker pixels to output flicker pixel signals at a second readout frequency greater than the first readout frequency; a plurality of frequency detectors to accumulate the flicker pixel signals and to perform frequency domain transformation of the accumulated flicker pixel signals; and a frequency analyzer to detect flicker by analyzing the flicker pixel signals transformed into the frequency domain.

Each of the frequency detectors may detect a dominant frequency among the flicker pixel signals transformed into frequency domain. The frequency detectors may calculate confidence values indicating how dominant frequencies are different from remaining frequencies of the flicker pixel signals transformed into frequency domain. The frequency analyzer may determine whether the confidence values are greater than a minimum confidence value, and detects flicker when at least two of the confidence values are greater than the minimum confidence value.

The system includes an image sensor may include the active pixels and flicker pixels, and an image signal processor including the frequency detectors and the frequency analyzer.

The system includes an image sensor may include the active pixels, the flicker pixels, the frequency detectors, and the frequency analyzer.

The flicker pixels may be located in a first region, and the active pixels may be located in a second region which does not overlap the first region. The flicker pixels may be located between the active pixels.

The system may include a row driver to apply row selecting signals to the active pixels, the row selecting signals applied at the first readout frequency to read out the active pixel signals, the row driver to apply flicker selecting signals to the flicker pixels, the flicker selecting signals applied at the second readout frequency to read out the flicker pixel signals.

In accordance with another embodiment, a method for detecting flicker in an image processing system includes accumulating flicker pixel signals output from flicker pixels; performing frequency domain transformation for the accumulated flicker pixel signals; and detecting flicker based on the flicker pixel signals transformed into the frequency domain, wherein the active pixels output active pixel signals at a first readout frequency, and the flicker pixels output the flicker pixel signals at a second readout frequency greater than the first readout frequency.

The method may include detecting a dominant frequency among the flicker pixel signals transformed into frequency domain, applying row selecting signals corresponding to the first readout frequency to the active pixels to output the active pixel signals; and applying flicker selecting signals corresponding to the second readout frequency to the flicker pixels to output the flicker pixel signals.

In accordance with another embodiment, an image sensor includes a first number of active pixels; and a second number of flicker pixels, wherein the first number of active pixels outputs active pixel signals at a first frequency and the second number of flicker pixels outputs flicker signals at a second frequency greater than the first frequency. The base may include an insulating layer on a conductive plate.

The first number may be greater than one and the second number is one or more.

The active pixels may be located in a first area, and the flicker pixels may be located in a second area which does not overlap the first area. Alternatively, the flicker pixels are interleaved with the active pixels. The active pixels may be arranged in a plurality of first rows and the flicker pixels may be arranged in a plurality of second rows interleaved with the first rows.

An image processing system may include an image sensor in accordance with the aforementioned embodiments.

An electronic device includes an image processor and an image sensor in accordance with the aforementioned embodiments coupled to the image processor.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
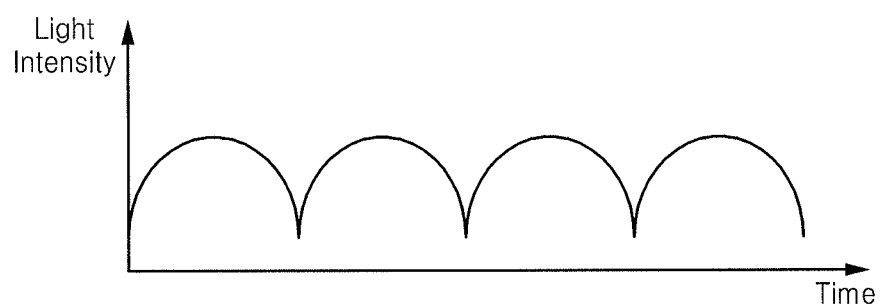
FIG. 1 illustrates an example of the intensity of fluorescent light over time.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an example of the intensity of fluorescent light over time. In FIG. 1, the x-axis represents time and the y-axis represents light intensity sensed by an image sensor. The intensity of the fluorescent light is periodic. In accordance with one type of fluorescent light, the intensity of this light may correspond to the absolute value of a sine wave. Other types of light may have a different periodic pattern. Fluctuations of the light intensity may cause flicker, which may degrade the quality of an image frame output from an image processing device. In order to correct flicker in the image frame, detection of the flicker may be performed in advance.

Figure 2:
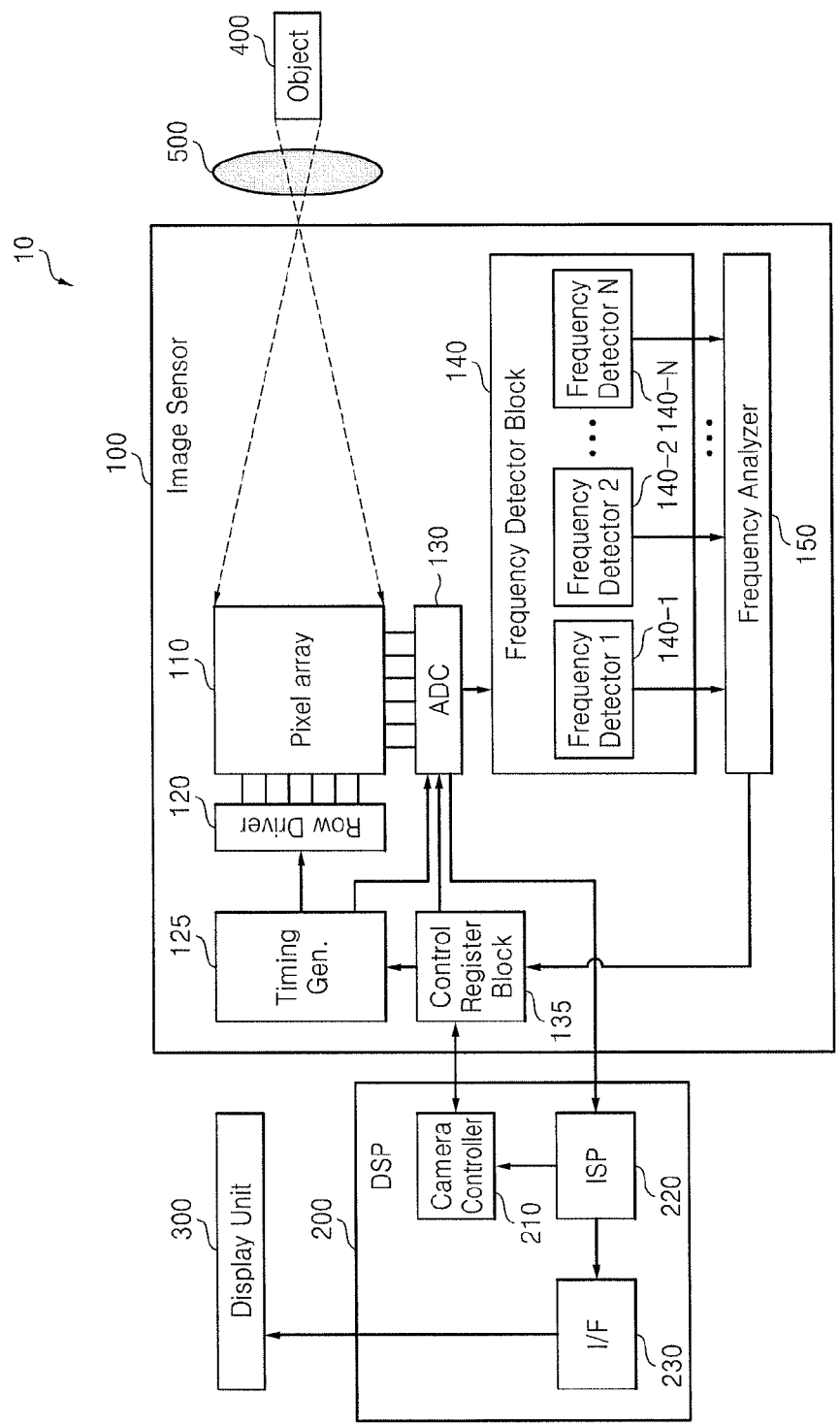
FIG. 2 illustrates an embodiment of an image processing system.

FIG. 2 illustrates an embodiment of an image processing system 10 which includes an image sensor 100 and a digital signal processor (DSP) 200. The image processing system 10 may be a digital still or video camera which may be found, for example, in a smart phone, pad-type device or tablet, personal computer, web cam, surveillance system, a monitor, or a SLR or pocket-type camera.

Referring to FIG. 2, the image processing system 10 senses an object 400 captured through a lens 500 under control of the DSP 200. The system then outputs one or more image frames sensed and output by the image sensor 100 to a display unit 300. The display unit 300 may include any type of apparatus capable of displaying an image frame, such as those in a, computer, tablet PC, smart phone, mobile digital camera, and other image output device as previously mentioned. The object may be exposed to fluorescent light, incandescent light, or any other light (indoor or outdoor) that exhibits a periodic pattern.

The DSP 200 includes a camera controller 210, an image signal processor (ISP) 220, and a PC I/F 230. The camera controller 210 controls a control register block 135. The camera controller 210 controls the image sensor 100 (that is, the control register block 135) using, for example, an Inter-Integrated Circuit (I2C).

The ISP 220 processes the image frame output from the image sensor 100 to be easily perceived by the human eye and outputs the processed image frame to the display unit 300 through the PC I/F 230. The ISP 220 is shown to be located inside the digital signal processor 200 in FIG. 2. However, in other embodiments, the location of the ISP 220 may be in a different location, e.g., attached or otherwise coupled to the digital signal processor. In one application, the ISP 220 may be located inside the image sensor 100. Also, the ISP 220 and the image sensor 100 may be embodied in one chip or separate chips.

The image sensor 100 includes a pixel array 110, a row driver 120, a timing generator 125, a control register block 135, an analog digital converter (ADC) 130, a frequency detecting block 140, and a frequency analyzer 150.

The pixel array 110 includes a plurality of active pixels of a matrix form. Each pixel is connected to a plurality of row lines and a plurality of column lines. Flicker pixels are located at a predetermined location relative to the active pixels. For example, in one non-limiting embodiment, the flicker pixels may be located around the plurality of active pixels. The pixel array 110 will be described in greater detail in subsequent drawings including FIGS. 3 and 41.

The timing generator 125 controls the operation of the row driver 120 and the ADC 130 by outputting a control signal to each of the row driver 120 and the ADC 130. The control register block 135 controls operation of the generator 125 and the ADC 130 by outputting a control signal to each of the timing generator 125 and the ADC 130 in response to a signal output from the frequency analyzer 150. Also, the control register block 135 operates under control of the camera controller 210. The camera controller 210 may be implemented in hardware, software, or both.

The row driver 120 drives rows of pixels in the pixel array 110. The row driver 120 performs this function by generating row selecting signals, which allow active pixel signals to be output from the active pixels. For example, the row driver 120 may decode a row control signal (for example, address signal) generated in the timing generator 165 and select at least one row line, among a plurality of row lines, in response to the decoded row control signal. Active pixels in the row selected by the row selecting signal output active pixel signals to the ADC 130.

The row driver 120 also generates flicker selecting signals to allow flicker pixel signals to be output from the flicker pixels. That is, a flicker pixel selected by a flicker selecting signal allows a flicker pixel signal to be output to the ADC 130.

The ADC 130 converts the active pixel signals and the flicker pixel signals into digital signals. The frequency detecting block 140 and the frequency analyzer 150 use the digital signals. The frequency detecting block 140 and the frequency analyzer 150 will be described in greater detail in subsequent drawings including FIGS. 7 and 8.

Figure 3:
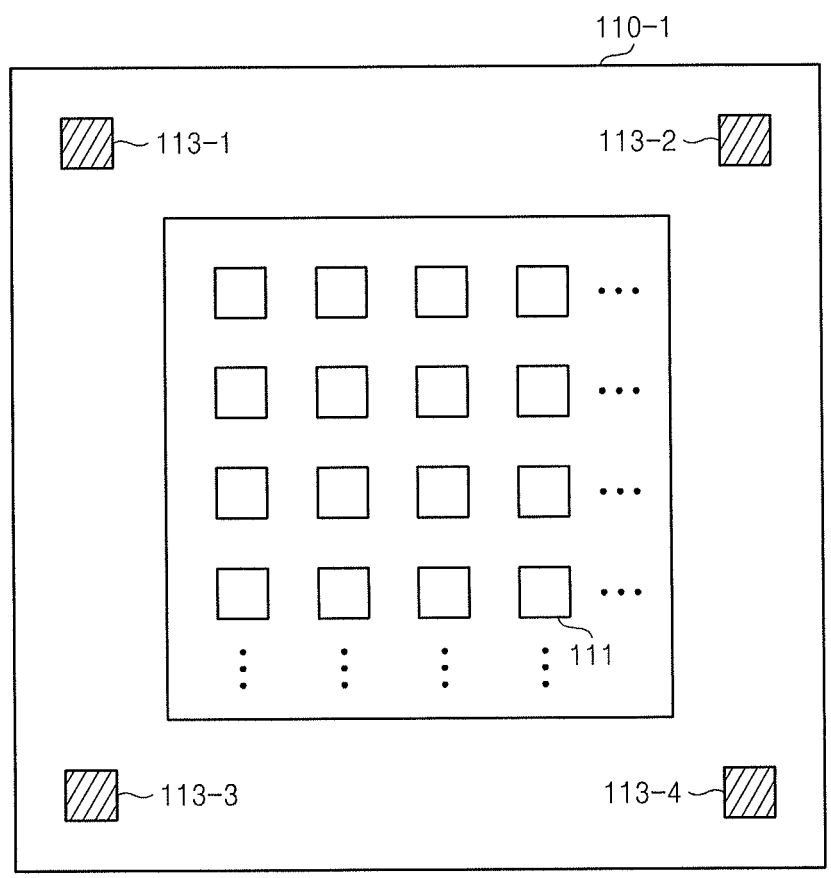
FIG. 3 illustrates an embodiment of a pixel array in FIG. 2.

FIG. 3 illustrates an embodiment of the pixel array shown in FIG. 2. Referring to FIGS. 2 and 3, a pixel array 110-1 includes active pixels 111 and flicker pixels 113-1 to 113-4. The active pixels 111 are disposed in a row direction and a column direction. In this embodiment, the flicker pixels 113-1 to 113-4 are at predetermined locations separated from the active pixels 111. For example, as shown in the non-limiting embodiment of FIG. 3, the flicker pixels 113-1 to 113-4 may be located in an area outside area of the active pixels 111.

While four flicker pixels 113-1 to 113-4 are shown in FIG. 3, a different number of flicker pixels may be included in other embodiments. For example, the pixel array 110-1 may include only one flicker pixel 113-1 or two or more flicker pixels including numbers greater than four as shown in FIG. 3.

The structure of the active pixels 111 and the flicker pixels 113-1~113-4 may be identical except for the readout frequency. The active pixels 111 output active pixel signals at a first readout frequency, and the flicker pixels 113-1 to 113-4 output flicker pixel signals at a second readout frequency. In one embodiment, the second readout frequency may be greater than the first readout frequency. The readout frequencies will be described in greater detail in subsequently drawings including FIGS. 5 and 6.

The active pixels 111 and flicker pixels 113-1 to 113-4 may include a plurality of transistors and light sensing elements (for example, photodiodes or pinned photodiodes). The active pixels 111 and the flicker pixels 113-1 to 113-4 sense light using the light sensing elements and convert the sensed light into electrical signals that correspond to image signal. In one embodiment, each of the active pixels 111 and the flicker pixels 113-1 to 113-4 may have a 4T pixel structure having four transistors.

Figure 4:
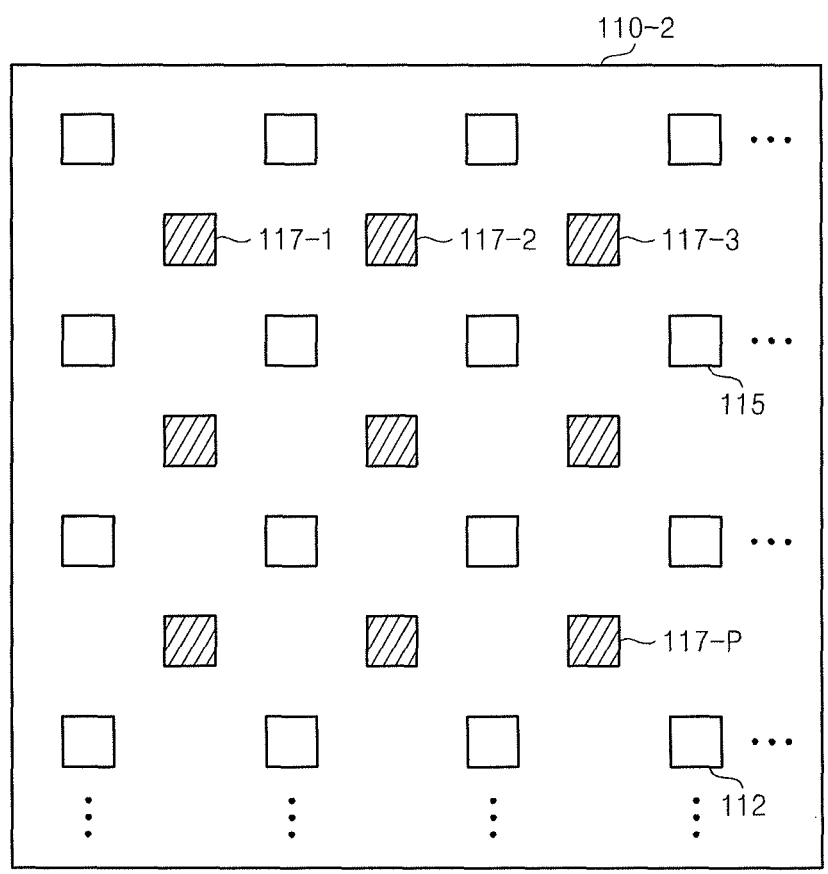
FIG. 4 illustrates another embodiment of the pixel array in FIG. 2.

FIG. 4 illustrates another embodiment of the pixel array in FIG. 2. In this embodiment, the pixel array 110-2 includes active pixels 112 and flicker pixels 117-1 to 117-P (P is a natural number). The active pixels 112 are disposed in a row direction and a column direction. The flicker pixels 117-1 to 117-P are located between adjacent rows of the active pixels 112. The active pixels 112 and the flicker pixels 117-1 to 117-P may correspond to the active pixels 111 and the flicker pixels 113-1 to 113-4 shown in FIG. 3 in terms of structure and sensing operation.

Figure 5:
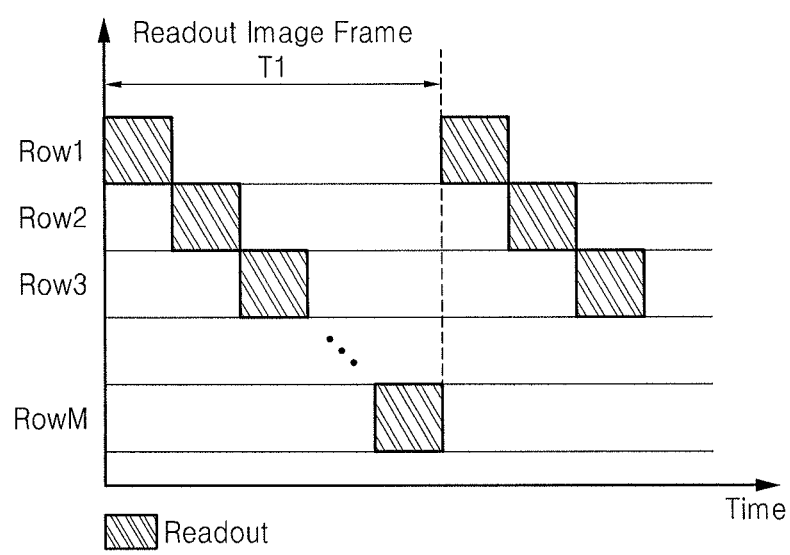
FIG. 5 illustrates an example of active pixel signals output from active pixels in the pixel array in FIG. 2.

FIG. 5 illustrates an example of active pixel signals output from the active pixels in the pixel array of FIG. 2. Referring to FIGS. 2, 4, and 5, the row driver 120 drives the pixel array 110 in units of rows. The active pixels 112 output active pixel signals in response to row selecting signals, corresponding to the first readout frequency 1/T1 output from the row driver 120.

For example, when the row driver 120 selects a first row Row1 among the plurality of rows Row1 to RowM (M is a natural number), active pixels 115 in the first row Row1 output active pixel signals. The row driver 120 may select the plurality of rows Row1 to RowM sequentially to read out one image frame during first period T1.

Figure 6:
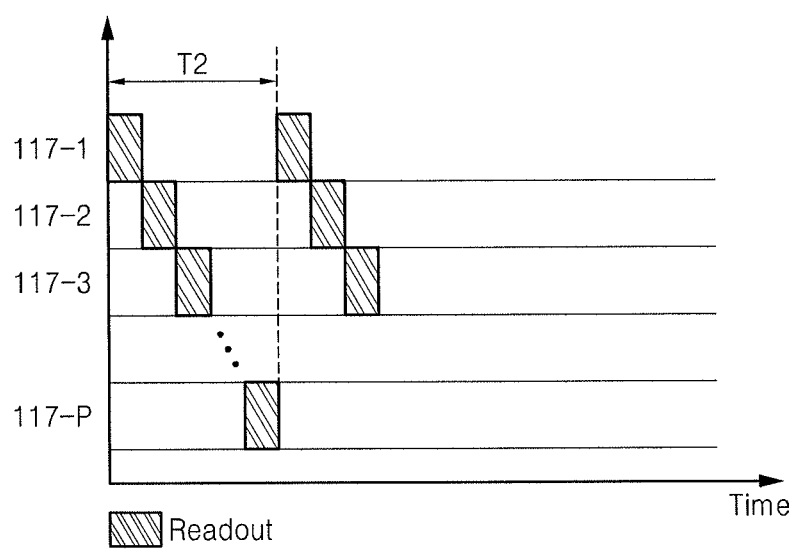
FIG. 6 illustrates an example of flicker pixel signals output from flicker pixels in the pixel array in FIG. 2.

FIG. 6 illustrates an example of flicker pixel signals output from the flicker pixels in the pixel array of FIG. 2. Referring to FIGS. 2, 4, 5, and 6, the flicker pixels 117-1 to 117-P output flicker pixel signals in response to flicker selecting signals, corresponding to the second readout frequency 1/T2. For example, when the row driver 120 selects the first flicker pixel 117-1 among the plurality of flicker pixels 117-1 to 117-P, the first flicker pixel 117-1 outputs a flicker pixel signal.

The second readout frequency 1/T2 has a greater frequency than the first readout frequency 1/T1 shown in FIG. 5. For example, the second readout frequency 1/T2 may be integer multiple of the first readout frequency 1/T1.

Figure 7:
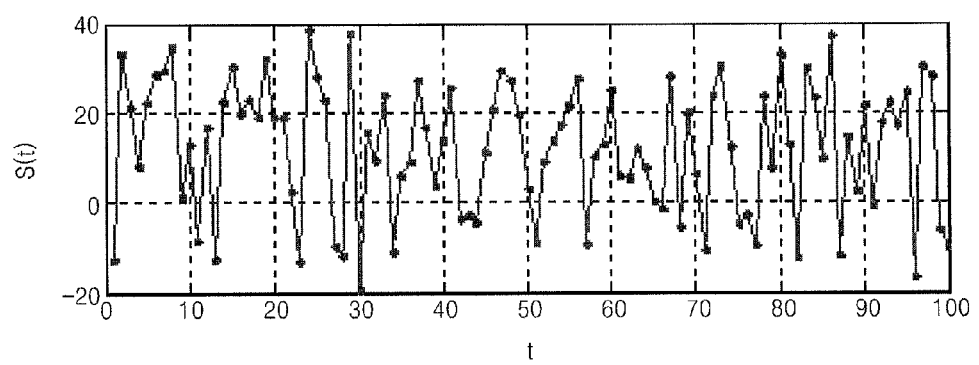
FIG. 7 illustrates an example of the size of the flicker pixel signals.

FIG. 7 is a graph illustrating an example of the size of the flicker pixel signals output from the flicker pixels. In this graph, the x-axis represents time and the y-axis represents the size of the flicker pixel signal S(t).

Referring to FIGS. 2, 4, and 7, the frequency detecting block 140 includes a plurality of frequency detectors 140-1 to 140-N (N is a natural number). The frequency detectors 140-1 to 140-N accumulate flicker pixel signals output from the flicker pixels 117-1 to 117-P. Each of the frequency detectors 140-1 to 140-N may accumulate flicker pixels signals from a predetermined zone, which may include one or more flicker pixels. For example, in one embodiment, the first frequency detector 140-1 accumulates flicker pixel signals output from the first flicker pixel 117-1 over time. The second frequency detector 140-2 accumulates flicker pixel signals output from the second flicker pixel 117-2, and so on.

Figure 8:
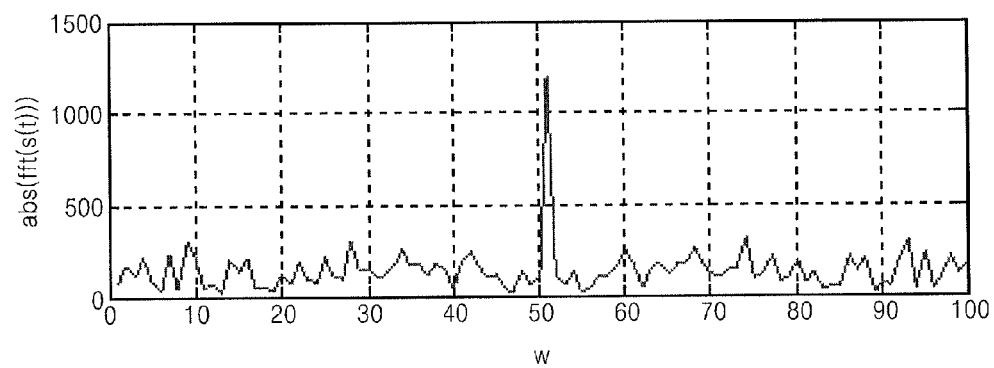
FIG. 8 illustrates an example of a frequency domain transformation of the flicker pixel signals in FIG. 7.

FIG. 8 is a graph illustrating an example of a frequency domain transformation of the flicker pixel signals in FIG. 7. In FIG. 8, the x-axis represents angular frequency and the y-axis represents absolute values abs(fft(S(t))) of the flicker pixel signals which have undergone frequency domain transformation.

Referring to FIGS. 2, 4, and 8, the frequency detectors 140-1 to 140-N perform frequency domain transformation for the accumulated flicker pixel signals. For example, the first frequency detector 140-1 performs a frequency domain transformation for the flicker pixels signals accumulated for flicker pixel 117-1 over a predetermined time period. The second frequency detector 140-2 performs a frequency domain transformation for the flicker pixel signals accumulated for flicker pixel 117-2, and so on. The frequency domain transformation may be, for example, a fast Fourier transform (fft).

Each of the frequency detectors 140-1 to 140-N detects the dominant frequency in the flicker pixel signals transformed into frequency domain. For example, referring to FIG. 8, the first frequency detector 140-1 detects the dominant frequency in the angular frequency (w)=50 rad/s. Each of the frequency detectors 140-1 to 140-N calculates a confidence value representing how the dominant frequency is different from the rest frequencies of the flicker pixel signals transformed into frequency domain.

For example, the first frequency detector 140-1 calculates a confidence value representing how the dominant frequency (which is the frequency at around the angular frequency (w)=50 rad/s) is different from the remaining frequencies. The confidence value may correspond to the absolute value of the dominant value max(abs(fft(S(t))) divided by a standard deviation std(abs(fft(S(t)))) of the absolute values abs(fft(S(t))) of the flicker pixel signals transformed into frequency domain. For example, the first frequency detector 140-1 may calculate the confidence value to be 6.26 in FIG. 8.

The frequency analyzer 150 analyses the flicker pixel signals transformed into frequency domain output from the frequency detectors 140-1 to 140-N and detects flicker. More specifically, the frequency analyzer 150 determines whether each of the confidence values is greater than a minimum confidence value or not, and then determines that flicker is detected if at least two of the confidence values are greater than the minimum confidence value. For example, the frequency analyzer 150 determines that flicker is detected if the confidence values calculated in the first frequency detector 140-1 and the second frequency detector 140-2 are greater than the minimum confidence value.

Also, the frequency analyzer 150 determines that global flicker is detected if all the confidence values calculated in the frequency detectors 140-1 to 140-N are greater than the minimum confidence value, and the dominant frequencies detected from each of the frequency detectors 140-1 to 140-N are similar. If not, the frequency analyzer 150 determines that local flicker is detected. Global flicker may be defined as flicker generated for the whole image frame, and the local flicker may be defined as flicker generated at one or more corresponding portions of the image frame.

The frequency analyzer 150 also outputs to the control register block 135 information indicating whether flicker is detected or not, dominant frequency information, and a signal including status information of the dominant frequency. The control register block 135 controls a frequency of row selecting signals corresponding to the first readout frequency of the active pixels 112, to remove flicker in response to the signal.

Figure 9:
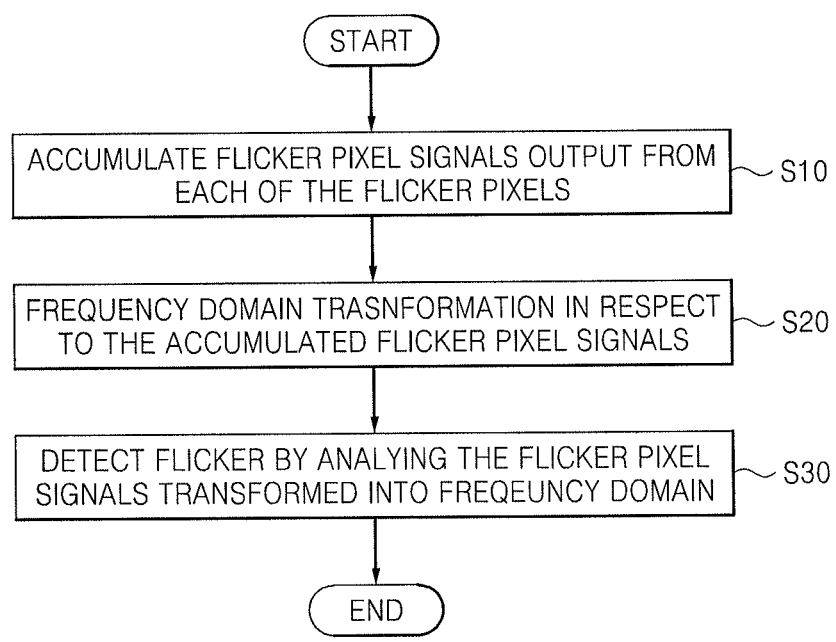
FIG. 9 illustrates an embodiment of a method for detecting flicker.

FIG. 9 illustrates one embodiment of a method for detecting flicker. Referring to FIGS. 2, 4, and 9, each of the frequency detectors 140-1 to 140-N accumulates flicker pixel signals output from the flicker pixels 117-1 to 117-P (S10). Each of the active pixels 112 outputs active pixel signals at the first readout frequency. Each of the flicker pixels 117-1 to 117-P outputs the flicker pixel signals at the second readout frequency which is greater than the first readout frequency. In other embodiments, the first readout frequency may be greater than the second readout frequency.

Each of the frequency detectors 140-1 to 140-N performs frequency domain transformation in respect to the accumulated flicker pixel signals (S20). The frequency analyzer 150 analyzes the flicker pixel signals transformed into frequency domain and detects flicker (S30).

Figure 10:
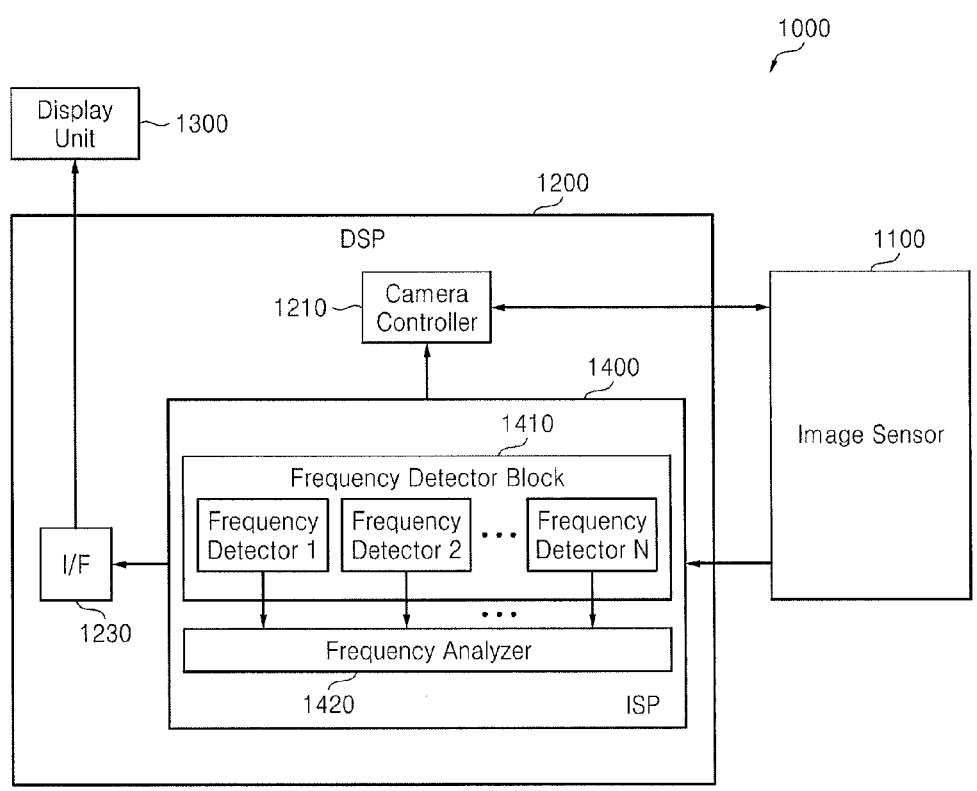
FIG. 10 illustrates another embodiment of an image processing system.

FIG. 10 illustrates an embodiment of an image processing system 1000 which includes an image sensor 1100 and a digital signal processor (DSP) 1200. The image processing system 1000 outputs an image data sensed and output by the image sensor 1100 under the control of the DSP 1200 to a display unit 1300.

The DSP 1200 includes a camera controller 1210, an image signal processor (ISP) 1400, and PC I/F 1230. The components 1100, 1200, 1210, 1230, 1300, and 1400 correspond to the respective component 100, 200, 210, 220, 230, and 300 of FIG. 2. However, unlike FIG. 2, a frequency detecting block 1410 and a frequency analyzer 1420 may be implemented in the ISP 1400. The image sensor 1100 may not include the frequency detecting clock 1410 and the frequency analyzer 1420.

Figure 11:
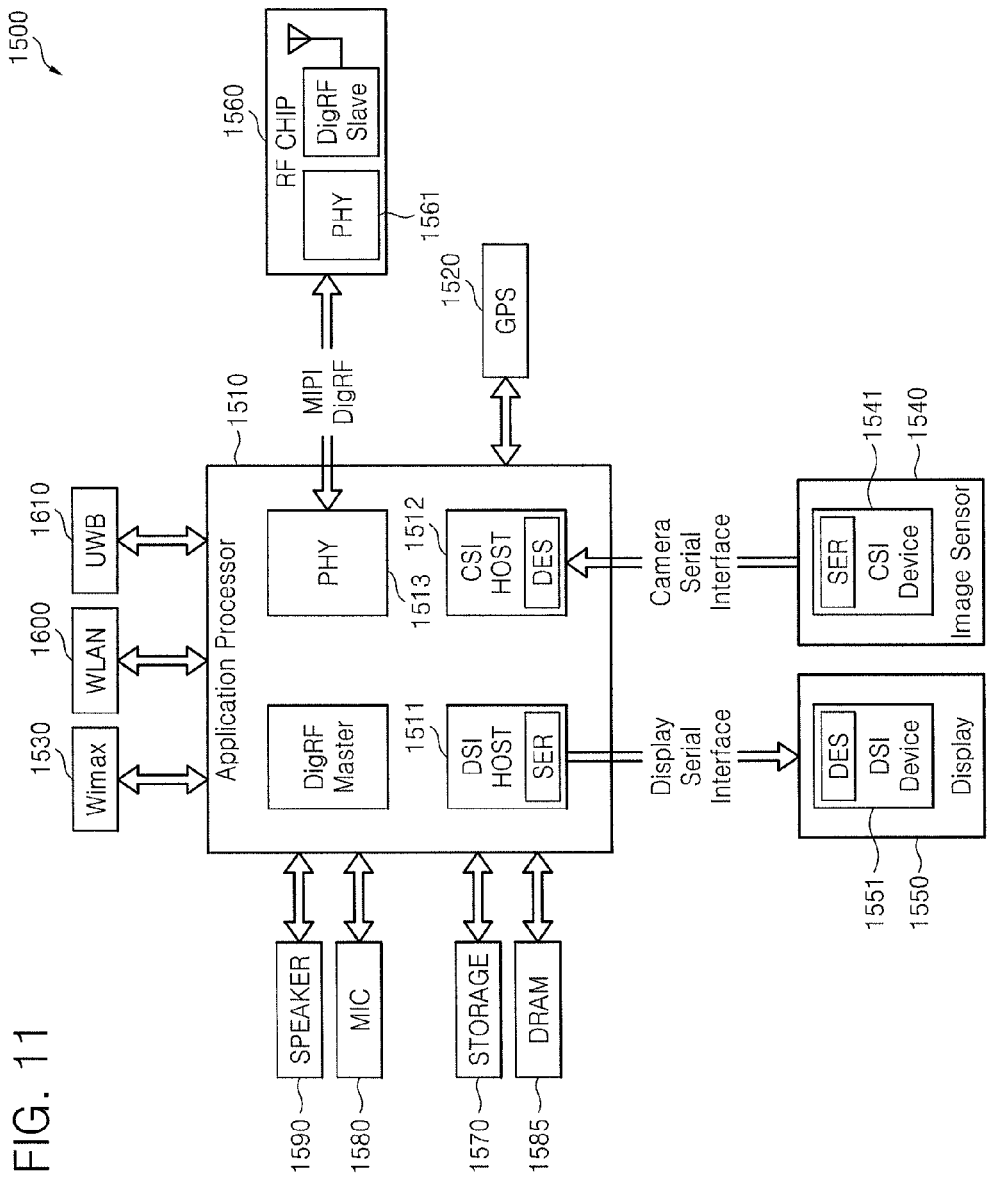
FIG. 11 illustrates another embodiment of an image processing system.

FIG. 11 illustrates an embodiment of an image processing system 1500, which may be included in a data processing device using or supplying an MIPI® interface. The data processing device may include, for example, mobile phone, personal digital assistants (PDA), portable multimedia player (PMP), or smart phone.

The image sensing system 1500 includes an application processor 1510, an image sensor 1540, and a display 1550. A CSI host 1512 embodied in the application processor 1510 performs serial communication with a CSI device 1541 of the image sensor 1540 through a camera serial interface (CSI). At this time, for example, a de-serializer (DES) may be embodied in the CSI host 1512 and a serializer (SER) may be embodied in the CSI device 1541. The image sensor 1540 may be the image sensor 100 of FIG. 2.

A DSI host 1511 embodied in the application processor 1510 performs serial communication with a DSI device 1551 of the display through a display serial interface (DSI). At this time, for example, a serializer (SER) may be embodied in the DSI host 1511, and a deserializer (DES) may be embodied in the DSI device 1551.

The image sensing system 1500 may further include an RF chip 1560 communicating with the application processor 1510. A PHY 1513 of the application processor 1510 and a PHY 1561 of the RF chip 1560 exchange data according to MIPI DigRF.

The image sensing system 1500 further includes a global position system (GPS) receiver 1520, a storage 1570, a mike 1580, a dynamic random access memory (DRAM) 1585, and a speaker 1590. The image processing system 1500 may communicate, for example, using a worldwide interoperability for microwave access (WIMAX) 1530, wireless local area network (WLAN) 1600, and/or ultra-wideband (UWB) 1610.

In accordance with one or more embodiments, a method and system are provided for detecting sensitive flicker with precision based on flicker pixel signals output at a readout frequency different (e.g., greater than) the readout frequency at which active pixel signals are output.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image processing system comprising:
 a plurality of active pixels to output active pixel signals at a first readout frequency;
 a plurality of flicker pixels to output flicker pixel signals at a second readout frequency greater than the first readout frequency;
 a plurality of frequency detectors to accumulate the flicker pixel signals and to perform frequency domain transformation of the accumulated flicker pixel signals; and
 a frequency analyzer to detect flicker by analyzing the flicker pixel signals transformed into the frequency domain, wherein each of the frequency detectors is to:
 detect a dominant frequency among the flicker pixel signals transformed into the frequency domain, and
 calculate a confidence value indicating how the dominant frequency is different from remaining frequencies of the flicker pixel signals transformed into the frequency domain, the frequency analyzer to detect flicker based on the confidence value to be calculated by each of the frequency detectors.

2. The system as claimed in claim 1, wherein the frequency analyzer:
 determines whether the confidence values are greater than a minimum confidence value, and
 detects flicker when at least two of the confidence values are greater than the minimum confidence value.

3. The system as claimed in claim 1, further comprising:
 an image sensor including the active pixels and flicker pixels, and
 an image signal processor including the frequency detectors and the frequency analyzer.

4. The system as claimed in claim 1, further comprising:
 an image sensor including the active pixels, the flicker pixels, the frequency detectors, and the frequency analyzer.

5. The system as claimed in claim 1, wherein:
 the flicker pixels are located in a first region, and
 the active pixels are located in a second region which does not overlap the first region.

6. The system as claimed in claim 1, wherein the flicker pixels are located between the active pixels and wherein the active pixels are to output signals to generate an image independently from output signals of the flicker pixels.

7. The system as claimed in claim 1, further comprising:
 a row driver to apply row selecting signals to the active pixels, the row selecting signals applied at the first readout frequency to read out the active pixel signals, the row driver to apply flicker selecting signals to the flicker pixels, the flicker selecting signals applied at the second readout frequency to read out the flicker pixel signals.

8. A method for detecting flicker in an image processing system, the method comprising:
 accumulating flicker pixel signals output from flicker pixels;
 performing frequency domain transformation for the accumulated flicker pixel signals;
 detecting a dominant frequency among the flicker pixel signals transformed into the frequency domain;

calculating a confidence value indicating how the dominant frequency is different from remaining frequencies of the flicker pixel signals transformed into frequency domain; and detecting flicker based on the confidence value for the flicker pixel signals transformed into the frequency domain, wherein the active pixels output active pixel signals at a first readout frequency, and the flicker pixels output the flicker pixel signals at a second readout frequency greater than the first readout frequency.

9. The method as claimed in claim 8, further comprising:

applying row selecting signals corresponding to the first readout frequency to the active pixels to output the active pixel signals; and applying flicker selecting signals corresponding to the second readout frequency to the flicker pixels to output the flicker pixel signals.

10. The system as claimed in claim 1, wherein the confidence value is based on a standard deviation of the flicker pixel signals relative to the dominant frequency.

11. The system as claimed in claim 1, wherein the frequency analyzer is to detect local flicker based on confidence values corresponding to flicker pixel signals output from N flicker pixels, where N is less than all the flicker pixels.

* * * * *